Jan. 13, 1970  A. S. ROBERTS  3,489,262
DEVICE FOR SORTING PIN-LIKE ARTICLES
Filed March 12, 1968  3 Sheets-Sheet 1
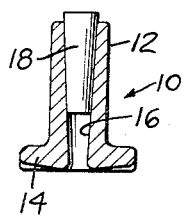
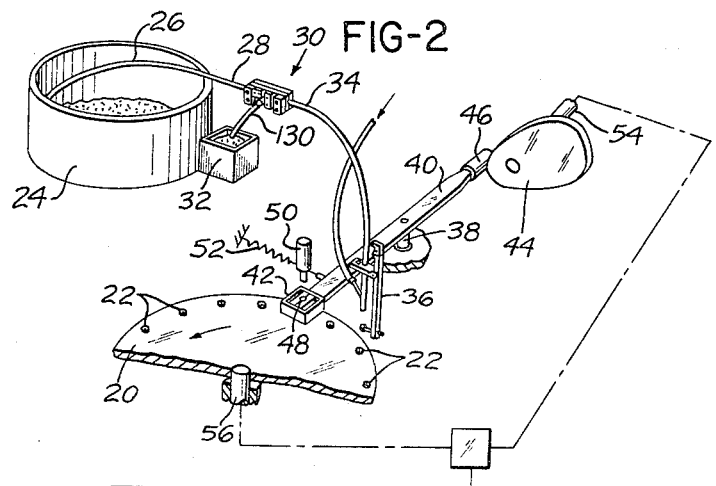
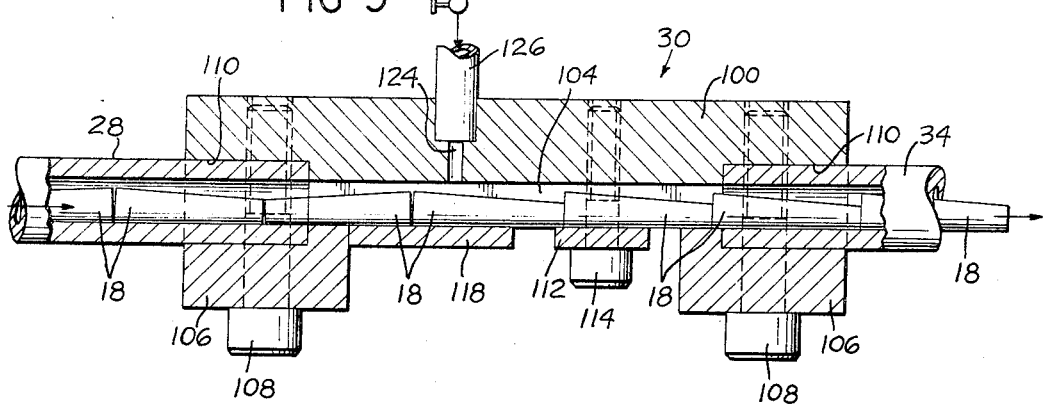
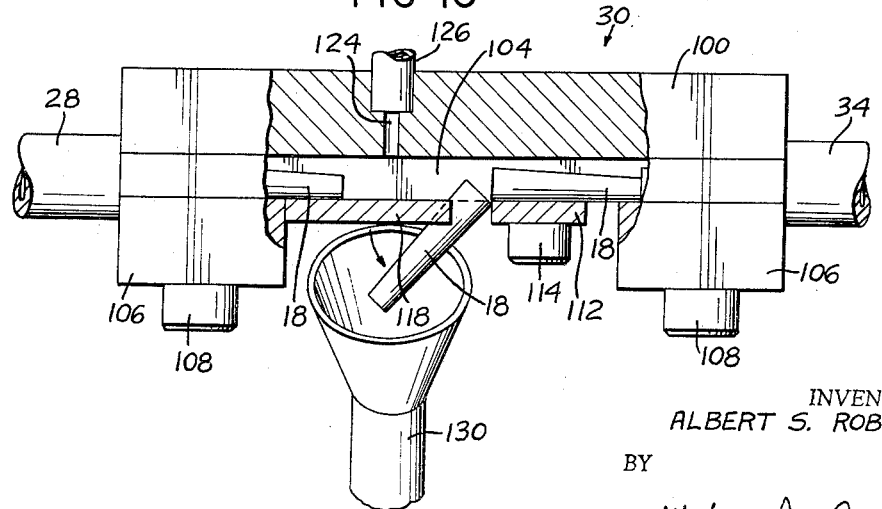
INVENTOR.
ALBERT S. ROBERTS
BY Jan. 13, 1970   A. S. ROBERTS   3,489,262
DEVICE FOR SORTING PIN-LIKE ARTICLES
Filed March 12, 1968   3 Sheets-Sheet 2
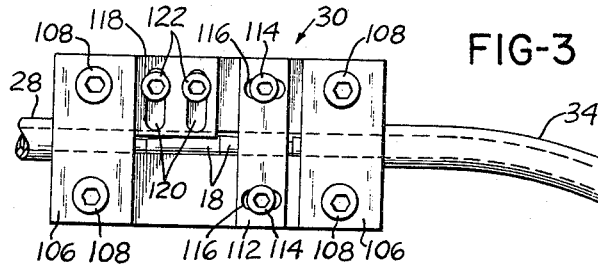
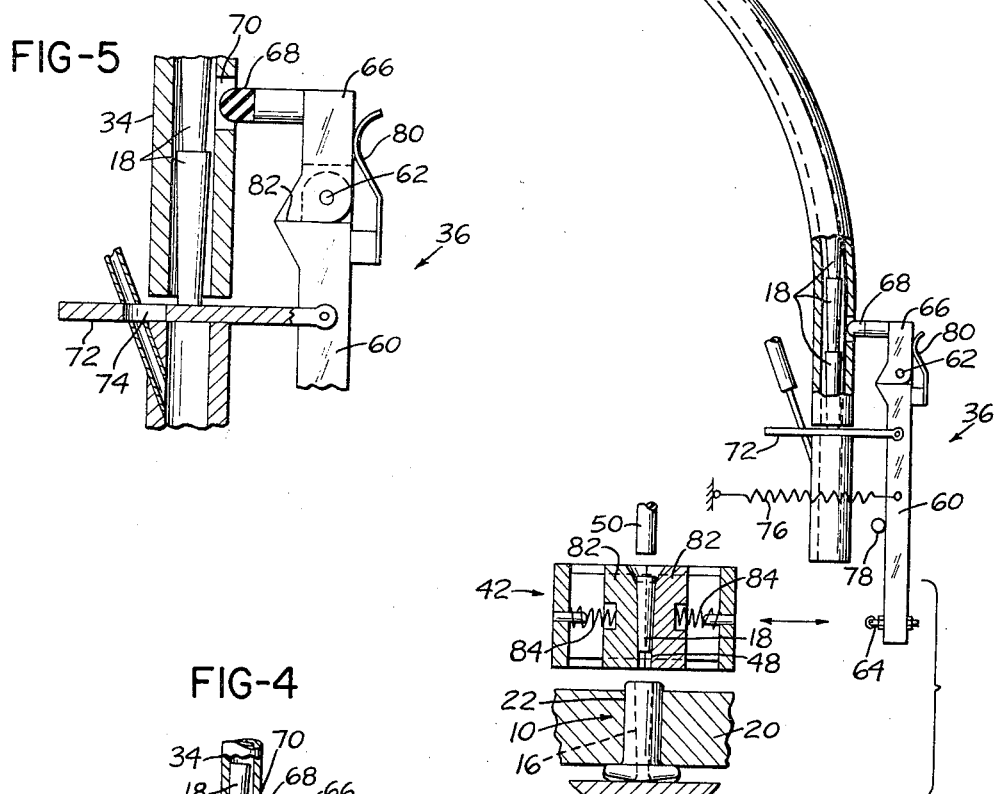
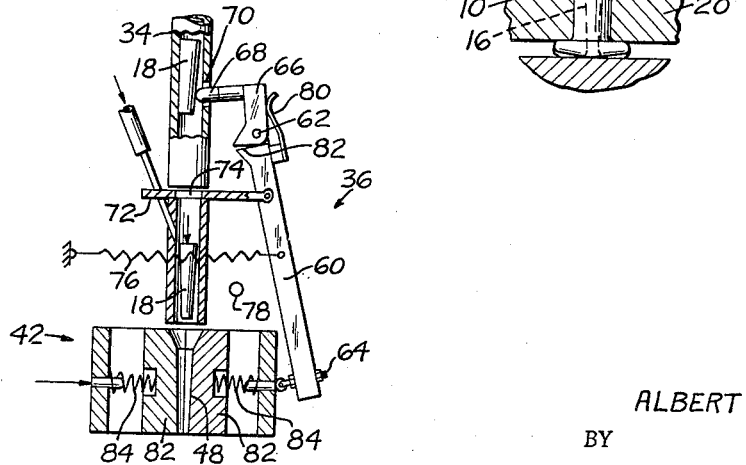
INVENTOR.
ALBERT S. ROBERTS
BY

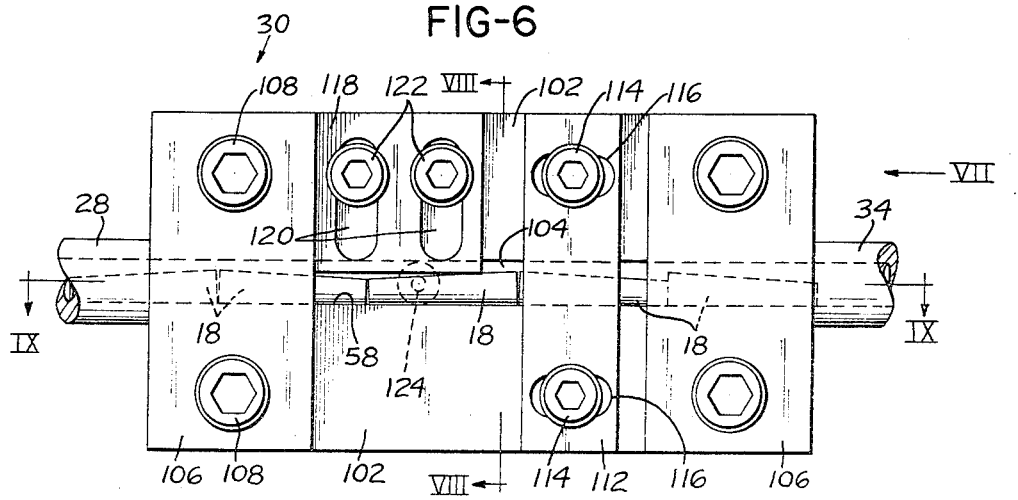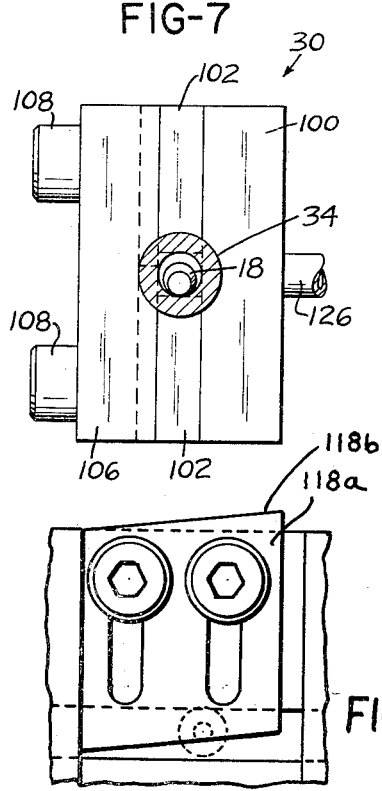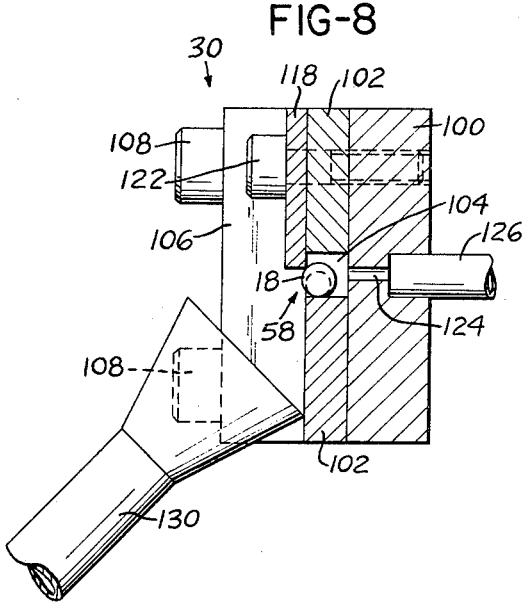

United States Patent Office 3,489,262
Patented Jan. 13, 1970

3,489,262
DEVICE FOR SORTING PIN-LIKE ARTICLES
Albert S. Roberts, Rector, Pa., assignor to Kennametal Inc., Latrobe, Pa., a corporation of Pennsylvania
Filed Mar. 12, 1968, Ser. No. 712,442
Int. Cl. B65g 47/24
U.S. Cl. 198—33           9 Claims

ABSTRACT OF THE DISCLOSURE

Tapered pins are dumped as a disorganized mass into a vibratory feeder from which the pins emerge in a single row which extends along their longitudinal axes. The row of pins is fed into an orienting device in which the pins having their larger ends forwardly directed are ejected by an air jet and the pins which have their smaller ends forwardly directed are restrained from ejection by a stop plate and proceed on through the orienting device to a point of use. The pins which are ejected from the orienting device are returned to the feeder for readmission to the orienting device.

---

The present invention relates to a feeding device and is particularly concerned with a device for feeding tapered pins and the like while simultaneously orienting the pins in a predetermined direction.

The feeding of tapered pins is not uncommon and a particular instance in which tapered pins must be fed is in connection with the manufacture of tire studs which consist of a body, usually metallic with a head on one end and with a hard wear resistant pin inserted axially into the body and projecting from the end thereof opposite the head.

Such pins may be cemented or brazed into bores provided therefor in the stud bodies but a preferred manner of assembling the pins with the bodies is to press a tapered pin, small end foremost, into a bore provided therefor in the body. Tire studs are made in large quantities and are relatively inexpensive so that they must be handled in volume and the assembling of the pins with the bodies must be done with economy while scrap due to improperly inserted pins must be kept at an absolute minimum.

The pins referred to, which are ordinarily formed of cemented tungsten carbide, are manufactured in volume and are generally fed from a vibratory feeder so that they move in the direction of their lengths toward a station where they are to be assembled with stud bodies. The pins are oriented without discrimination by the vibratory feeder and emerge therefrom in a single line with some of the pins emerging large end foremost and others emerging small end foremost. In the normal course of events about half the pins pointed one direction and the other half point in the opposite direction.

Heretofore, assembly machines for assembling tire stud pins with tire stud bodies have employed rather complicated devices for orienting the fed pins in a common direction after the pins leave the vibratory feeder and before they reach the assembly station. Such devices embody a plurality of moving parts and adjustments and are subject to considerable wear and easily become jammed and form a major source of trouble in connection with tire stud assembling machines. Further, the orienting devices referred to are bulky and expensive and require a substantial amount of power to operate.

With the foregoing in mind, it is a primary objective of the present invention to provide an arrangement for orienting tapered pins fed from a vibratory feeder in a common direction.

Another object is the provision of the device of the nature referred to above which is extremely compact and inexpensive.

A still further object of this invention is the provision of a device of the nature referred which is readily adjustable to accommodate it to variations in pin sizes and which embodies no moving parts, is completely trouble free in operation, and is substantially 100% effective for creating the desired orientation of the feed pins.

It is also an object to provide a device of the nature referred to which is readily adapted to and can be incorporated in existing equipment as well as new manufacture.

A further, and somewhat general, objective of the present invention is the provision of the present device for orienting feed pin like articles which are larger on one than on the other, such as by being tapered, or having a head on the one end and which will accomplish the said orientation inexpensively and automatically.

A still further objective of this invention is the provision of a device for orienting articles of the nature referred in which the incorrectly oriented articles are expelled from the device and in such a manner that they can be captured upon expulsion from the device in a predetermined oriented position.

The foregoing objects of the present invention as well as other objects and advantages thereof become more apparent upon reference to the following detailed specification taken in connection with the accompanying drawings in which:

FIGURE 1 is a sectional view showing a tire stud of the nature assembled on a machine with which the present invention is adapted for incorporation;

FIGURE 2 is a schematic perspective view showing a portion only of a typical assembly machine having an orienting device according to the present invention incorporated therein;

FIGURE 3 is a fragmentary view of the portion of the machine drawn at considerably enlarged scale and showing the orienting device of the present invention and the tube leading therefrom for conveying the oriented pins from an assembly station and also illustrating an escapement associated with the aforementioned tube;

FIGURE 4 is a view like FIGURE 3 but shows only the end of the tube adjacent the assembly station and illustrating how pins are released from the tube to a carrier in which they are carried into a position of alignment with the stud body in which the pin is to be inserted;

FIGURE 5 is a view showing more in detail the escapement mechanism associated with the delivery tube, and a pneumatically operated accelerating device for driving the pins out of the tube and is drawn at still further increased scale;

FIGURE 6 is a side elevational view drawn at enlarged scale showing the appearance of the pin orienting devices when it is viewed from the side from which improperly oriented pins are ejected;

FIGURE 7 is a view looking in at the right end of FIGURE 6 as indicated by the arrow VII.

FIGURE 8 is a vertical sectional view indicated by line VIII—VIII on FIGURE 6;

FIGURE 9 is a plan sectional view indicated by line IX—IX on FIGURE 6 and showing how a properly oriented pin is caused to pass completely through the device; and FIGURE 10 is a view like FIGURE 9 but shows how an improperly oriented pin is caused to be discharged from the device.

FIGURE 11 is a side view of a modified form of the stop member.

Referring to the drawings somewhat more in detail in FIGURE 1, there is shown a tire stud 10 having a body consisting of a symmetrical shank portion 12 with a head 14 formed on one end thereof. A bore 16 extends into the shank of the stud body from the end opposite head 14 and may, in fact, extend completely through a stud body as shown on the drawings. Mounted in the stud body is a hard wear resistant pin 18, tungsten carbide, for example, which is mounted in bore 16 so that the major portion of the pin is inside the bore while a minor portion thereof projects from the end of shank 12 at the opposite head 14.

The particular pin 18 illustrated in FIGURE 1 is tapered and is mounted in bore 16 by presenting the pin small end foremost to the bore and then pressing the pin into the bore until the desired projection of the pin at the outer end is obtained.

The assembling of the stud bodies with the pins is carried out automatically in a high speed automatic assembly machine to which the stud bodies are supplied from one source while the pins are supplied thereto from another source. The stud bodies, inasmuch as they have a head of substantial size on one end, are relatively easy to orient and feed to the assembly machine in the proper position. The pins 18, however, have only a small taper thereon the side of the pin making, for example, an included angle of about 5 to 6 degrees therebetween. It is not possible with the usual vibratory type feeder which is the preferred sort of feeding mechanism to employ, to determine which end of a pin is emerging from the feeder and, accordingly, the customary practice, in assembly machines of the nature referred to, is to include a rather complex and expensive mechanical device which handles each pin individually and supplies it in a certain oriented position to a feed passage leading to the assembly station of the assembly machine. A portion of such an assembly machine is illustrated in FIGURE 2. The machine fragmentary illustrated in FIGURE 2 comprises a rotary table 20 having notches 22 distributed about the periphery thereof to which stud bodies to be assembled with pins are inserted with the head ends of the bodies on the underneath side of the table so that the shanks of the stud bodies extend upwardly toward the top of the table in position for receiving pins. The feed station for the stud bodies is not illustrated in FIGURE 2.

Adjacent the table is a vibratory feeder of a known type designated 24 to which pins, such as pin 18, are supplied in bulk. The feeder has an upwardly spiraling track 26 around the inside which communicates at the top of the feeder with a tube 28. As the vibratory feeder operates, the pins therein progress along the spiral track in end to end relation and are delivered endwise into tube 28. As mentioned previously, about half the pins will have their larger ends foremost on entering tube 28 and about half will have their smaller end foremost.

The pins pass from tube 28 into the orienting device 30 according to the present invention and which will be described more fully hereinafter. Device 30 ejects the pins passing therethrough with their larger ends foremost into a receiver 32 although it will be understood that the ejecting pins could be returned directly into feeder 26.

The pins that pass through device 30 are received in a tube 34 and all of the pins received in tube 34 have their small ends at the front.

Tube 34 leads downwardly to a position above rotary table 20 and has associated therewith adjacent its lower end an escapement mechanism 36 also to be described more in detail hereinafter. Mounted on the frame of the assembly machine on a pivot 38 is an arm 40 which, at its table end, carries a pin receiver or carrier 42 to which pins are supplied from lower end of tube 34 when the escapement 36 is actuated. A rotary cam 44 is located adjacent a roller 46 on the end of arm 40 opposite carrier 42 so that as the cam rotates, the arm will swing back and forth. The carrier 42, due to the oscillation of arm 40 as brought about by rotation of cam 44 has two operative end positions. In one position a tapered hole 48 in the carrier is aligned with the lower end of tube 34 so that a pin released from tube 34 will drop into hole 48. In its other position hole 48 in carrier 42 aligns with a stud body in a notch 22 of rotary table 20 so that a reciprocable punch 50 can push the pin from the carrier into the stud body. It will be noted that arm 40 is cam actuated in one direction but is returned to its second end position by a tension spring 52.

It will be evident that the rotation of table 20 must be in the form of an indexing movement and that it must be coordinated with the rotation of cam 44. To this end, a drive motor M is provided which drives shaft 54 supporting cam 44 and shaft 56 attached to table 20 so that, following the operation of punch 50, the table will index to bring the next station into alignment with plunger 50 while, simultaneously, arm 40 will swing from its assembling position to its pin receiving position and then back to its assembling position. The described cycle thereafter repeats itself.

FIGURE 3 shows, at somewhat enlarged scale, the orienting device 30 with tube 34 leading therefrom, the escapement 36, the carrier 42 and a stud body in assembling position in the rotary table 20.

The orienting device 30 which is shown more in detail in FIGURES 6 through 10 has a slot or gap at 58 through which improperly oriented pins are ejected while the properly oriented pins pass on through the device into tube 34. Inasmuch as it is important for the pins to be supplied to carrier 42 one at a time, the escapement 36 is provided associated with tube 34. Escapement 36 comprises a longer arm 60 pivotally supported at 62 and carrying an adjustable abutment rod 64 at its lower end. The adjustable abutment rod is engaged by carrier 42 when the carrier moves to its pin receiving position and operates the escapement device to release a single pin from tube 34 into a hole 48 of the carrier.

Also pivotally supported at 62 is a shorter arm 66 which has a button-like projection 68 adapted to enter tube 34 through hole 70 and to engage the adjacent pin 18 when the arm is moved counterclockwise about pivot 62. Longer arm 36 has a slide 72 connected thereto with an aperture 74; and when arm 60 is moved clockwise about pivot 62, slide 72 will be moved toward the right until aperture 74 registers with the passage in tube 34 whereupon the pin resting on the slide will drop down through the tube. At this time, of course, projection 68 clamps the next pin in the tube so that only one pin at a time can be fed from the tube, and this will only occur when carrier 42 is moved to align hole 48 with tube 34. Spring 76 is provided for returning the arms to a rest position against stop pin 78.

Since arm 60 must travel farther than arm 66, arm 66 is biased in counterclockwise direction about pivot 62 by spring 80 while abutment means 82 on the arm limits the amount of counterclockwise movement on arm 60 that can be taken by arm 66.

Carrier 42 has therein two blocks 82 biased toward each other by springs 84 so that after a pin drops into tapered hole 48, which is formed by registering grooves in blocks 82, it can thereafter be pushed therefrom by downward movement of punch 50 when the carrier 42 returns to assembling position in which it is shown in full lines in FIGURE 3.

The sorting device according to the present invention is shown more in detail in FIGURES 6 through 10. In these figures, it will be noted that the device comprises a main back plate 100 and mounted thereon in parallel spaced relation are the longitudinally extending bar like members 102 that define therebetween a channel or passage 104. Vertically extending bar like members 106 at the ends of bar like members 102 and cap screws 108 clamp the aforementioned assembly of bars together. The assembly is bored at opposite ends as at 110 for receiving the ends of the aforementioned tubes 28 and 34.

The lateral space between bars 106 is equal to about twice the length of a pin to be passed through the device. As will be seen in FIGURE 6, adjacent the right hand one of bars 106 is a vertical closure member 112 with cap screws 114 extending through slots 116 so that the member can be adjusted in the longitudinal direction of passage 104.

Immediately adjacent the left hand one of bars 106 is a stop member 118, which extends part way over passage 104 from above and forms gap 58 and is adjustable in the vertical direction by virtue of slots 120 and cap screws 122. The length of stop member 118 in the direction of passage 104 is preferably about the same length of a pin passing through the passage. The distance between the right hand edge of stop member 118, as it is viewed in FIGURE 6, and the left hand edge of closure member 112 is only a portion, about ⅓, of the length of a pin passing through the device.

In back plate 100 about half way between the right hand edge of bar like member 106 and the left hand edge of closure member 112 is a small port 124 which is connected with a tube 126 which supplies air at relatively low pressure to the port to cause a relatively gentle air blast to move transversely of passage 104 toward the aforementioned opening or gap 58 and which is that opening at the open side of passage 104 and under the lower edge of stop member 118.

The pins 18 in passing through the device as it is illustrated in FIGURE 6 move toward the right and the device will automatically expel the pins which are oriented improperly. The pins are required to be delivered to tube 34 small end formost whereas they are supplied to tube 28 in random fashion. The manner in which the device operates can be seen from FIGURES 6, 8, 9 and 10. The gap 58 has a vertical dimension greater than the dimension of a small end of a pin but smaller than the dimension of a large end of the pin. Thus, when the pins are advanced rightwardly through the device with the small end foremost, the pins are prevented from turning under the influence of the air blast from port 124 due to the engagement of the larger end of the pin by the lower edge of stop member 118. Once the pins have reached the point that the leading end thereof moves behind member 112, the pins will, of course, be prevented from turning and will continue on through the device and into tube 34. If the pins, on the other hand, enter the device large end foremost, the pins will advance to the point that the larger end of the pins is disposed in the space between stop member 118 and closure member 112 and at which time, the pin is no longer engaged by the lower edge of stop plate 118. The smaller end of the pin will thus be free to swing outwardly from the device under the influence of the air blast from port 124 and the pin will be ejected from the device. As will be seen in FIGURE 8, pins ejected in this manner could be captured in a feed tube 130 to which the pins would be supplied small end foremost and which tube could be employed for supplying oriented pins to another work station.

It will be appreciated from the foregoing description that only the pins having their small ends foremost will pass through the device from left to right in FIGURE 6. However, it also follows that if the pins were fed through the device in FIGURE 6 from right to left, the only pins which would pass completely through the device would be those with their larger ends foremost.

As an example of the size of the article being handled, a pin may be .350 inch in length and have a maximum diameter of 0.113 inch at the large end and a smaller diameter of 0.099 inch at the small end. The device according to the present invention might be two inches in overall length, about an inch high, and a little over ½ inch from front to back. It will be evident that the device is quite small and, therefore, inexpensive but, nevertheless, operates with substantially 100% efficiency. Each device has sufficient adjustability to accommodate a range of pin sizes so that with a fairly small number of devices a great many pins of different diameters and lengths can be handled.

As shown in FIG. 11, a modified stop member 118a has its lower edge inclined so as to define a passage tapering from one end to the other so that better ejection of the pins is obtained. The upper edge 118b of the stop member 118a is tapered and may also be used to form a slot. In any case, due to the location of the port 124, the small ends of the pins that are ejected tend to swing outwardly as shown in FIGURE 10 so that they can be captured small end foremost and, thus, be in the posititon of orientation required for being presented to a work station or for being returned to the feeder for being fed back through the device.

As has been mentioned, the pins are fed through the device small end foremost, the closure member 112 will capture the small end of the pin before the pin is in position to be blown laterally through the opening and these pins will, therefore, pass on through the device.

The pins can be returned directly to the feeder as the device 30 is mounted close to the discharge end of the spiral channel or track 26 in the feeder and the pins, thus, returned to the feeder could be merely dropped into the loose batch of pins in the bottom of the feeder or they could be returned to the channel 26 in advance of the feeder discharge opening and in such oriented position as to pass through the device 30 without ejection therefrom.

From the foregoing, it will be evident that the present invention is particularly well adapted for sorting tapered pins but it will be appreciated it could also be used for sorting or orienting pin-like members having small heads or enlarged portions at one end.

The device can be made of a hardened steel or parts which show a high rate of wear, such as stop member 118 could be made of a cemented carbide material, or etched with cemented carbide.

It will be evident that the present invention is susceptible of modification to adapt it to particular conditions of operation, and it is intended to include within the purview of the present invention.

What is claimed is:

1. In a device through which pin-like elements are passed from an entrance end to an exit end in end to end relation, said elements being larger at one end than at the other, said device having a lateral ejection opening and being operable to eject therethrough those of said elements passing therethrough which are oriented in one direction so that with a supply of randomly oriented elements to the entrance end of the device will be oriented in one and the same direction; said device comprising a body having a passage extending therethrough with an entrance end and an exit end, said passage being of a size in cross section such that the said pin-like elements can pass therethrough only in single file end to end relation, an elongated slot-like opening formed in the side of said body communicating with said passage, said opening extending in a direction parallel to said passage and being at least as long as a said element, said opening at one end having a width greater than that of the smaller end of a said element and smaller than that of the larger end of a said element and at the other end having a width greater than that of the larger end of said element, and means for blowing air laterally across said passage toward said opening and intermediate the length of said opening whereby a said element moving along said passage and oriented in one direction will be ejected through said opening whereas a said element which is oriented in the opposite direction will pass through said device and emerge therefrom at the exit end of the passage.

2. A device according to claim 1 in which said passage is substantially horizontal and has a solid substantially horizontal bottom wall and said opening extends upwardly from the plane of said bottom wall.

3. A device according to claim 2 which includes a plate-like stop member mounted on the side of said body and vertically adjustable thereon and overlying the upper portion of said opening so as to define the lateral side wall of said passage in the range of said opening and so the lower edge of said stop member forms the upper edge of said opening.

4. A device according to claim 3 in which the lower edge of said stop member is inclined relative to the plane of the bottom wall of said passage in the longitudinal direction of said passage.

5. A device according to claim 3 in which stop member is shorter in the longitudinal direction of said passage than said opening and extends from said one end of said opening toward but terminates short of the said other end of the opening, the longitudinal space between the said other end of said opening and the adjacent end of said stop member comprising that end of said opening which is wider than the larger end of said element.

6. A device according to claim 5 which includes a closure member longitudinally adjustably mounted on said body and forming the portion of the side wall of said passage which is adjacent said other end of said opening and on the side of the body in which the opening is located.

7. A device according to claim 2 which includes a conduit adjacent said opening which receives the ejected elements in the same condition of orientation as the elements leaving the exit end of the passage in the device.

8. A device according to claim 2 which includes a vibratory feeder having an outlet connected to the entrance end of said passage and operable to feed said elements in single file end to end relation into said entrance end of said passage, and said ejected elements being ejected from said device back into said feeder.

9. A device according to claim 2 which includes a vibratory feeder having an outlet connected to the entrance end of said passage and operable to feed said elements in single file end to end relation into said entrance end of said passage, said feeder comprising a spiral feed channel leading to said outlet, and conduit means arranged adjacent the opening in said device so as to receive the elements ejected therefrom and operable to return the ejected elements to said channel at a point therealong in advance of said outlet and in the position of orientation in which the elements will pass through the device without ejection therefrom.

References Cited

UNITED STATES PATENTS

| | | | |
|---|---|---|---|
| 2,904,162 | 9/1959 | Simer | 221—157 X |
| 3,012,651 | 12/1961 | Hawkes | 221—157 X |

GERALD M. FORLENZA, Primary Examiner

G. F. ABRAHAM, Assistant Examiner

U.S. Cl. X.R.

193—43; 221—157